US007120698B2

(12) United States Patent
Krishnapuram et al.

(10) Patent No.: US 7,120,698 B2
(45) Date of Patent: Oct. 10, 2006

(54) ACCESS CONTROL FOR AN E-COMMERCE APPLICATION

(75) Inventors: Madhu Krishnapuram, Mountain View, CA (US); Stayton D. Addison, Jr., San Jose, CA (US); Shreenivas G. Kand, Santa Clara, CA (US); Mangesh Gondhalekar, Santa Clara, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 807 days.

(21) Appl. No.: 09/956,083

(22) Filed: Sep. 20, 2001

(65) Prior Publication Data

US 2003/0055991 A1    Mar. 20, 2003

(51) Int. Cl.
*G06F 15/16*   (2006.01)
*G06F 7/00*    (2006.01)

(52) U.S. Cl. .......................................... 709/229; 707/9
(58) Field of Classification Search ........ 709/216–219, 709/225–226, 227–229; 707/9–10; 713/182–185
See application file for complete search history.

(56) References Cited

U.S. PATENT DOCUMENTS 6,141,658 A *  10/2000  Mehr et al. ..................... 707/7
6,269,380 B1 *  7/2001  Terry et al. ................. 707/200
6,308,179 B1 * 10/2001  Petersen et al. ............. 707/102
6,381,579 B1 *  4/2002  Gervais et al. ................ 705/8
6,662,181 B1 * 12/2003  Icken et al. ..................... 707/9
6,732,100 B1 *  5/2004  Brodersen et al. ............. 707/9

* cited by examiner

*Primary Examiner*—Glenton B. Burgess
*Assistant Examiner*—Yasin Barqadle
(74) *Attorney, Agent, or Firm*—Michael C. Martensen; William J. Kubida; Hogan & Hartson LLP

(57) ABSTRACT

A system and method for selectively granting access to a target object. In one embodiment, the system includes an object data store, an access control instruction data store, an action data store, a context, and an access determination engine. The object data store includes a plurality of hierarchically structured target objects and a plurality of hierarchically structured actor objects. The access control instruction data store includes a plurality of hierarchically structured access control instructions. The action data store comprising a plurality action objects. The context includes an actor attribute, an action attribute, and a target attribute. The access determination engine configured to selectively grant access to the target object based on a first set of access control instructions having attributes that match the context and a second set of access control instructions having attributes that are hierarchically broader than the attributes of the context.

18 Claims, 5 Drawing Sheets

ACCESS CONTROL FOR AN E-COMMERCE APPLICATION

BACKGROUND OF THE INVENTION

1. Field of the Invention

The present invention relates to a system and method for a hierarchical access determination system and method, and more particularly to a system and method for determining access to a target object based on an actor attribute, an action attribute and a target attribute to determine which access control instructions are relevant to a particular access request.

2. Discussion of the Related Art

Conventional systems and methods are available for protecting resources or target objects from unauthorized access and manipulation. Many current systems have limited inheritance capabilities. For example, although a current directory server may enable an access control instruction ("ACI") to designate a group of targets, it is not possible to implement complex ACIs in which access rights are determined based upon the hierarchical structure of the actor data store, the action data store, and the target data store. Furthermore, current directory servers do not allow an administrator to readily extend the types of actions controlled by the system. For example, conventional directory servers enable an administrator to establish ACIs relating to a set of predefined actions: reading, writing, adding, deleting, searching, comparing, and self-writing. However, the systems may not be configured to enforce administrator created actions, such as a "buy_from_catalog" action.

Additionally, current directory servers are not configured to allow an administrator to establish an implication hierarchy, or a logical hierarchy relating to actions. Other limitations may exist with current access control systems.

SUMMARY OF THE INVENTION

Accordingly, the present invention is directed to a hierarchical access determination system and method that substantially obviates one or more of the problems due to limitations and disadvantages of the related art.

Additional features and advantages of the invention will be set forth in the description that follows, and in part will be apparent from the description, or may be learned by practice of the invention. The advantages of the invention will be realized and attained by the structure and method particularly pointed out in the written description and claims hereof as well as the appended drawings.

A system for selectively granting access to a target object is disclosed. The system includes an object data store comprised of a plurality of hierarchically structured target objects and a plurality of hierarchically structured actor objects The system also includes an access control instruction data store comprising a plurality of hierarchically structured access control instructions. The system also includes a context comprising an actor attribute, an action attribute, and a target attribute. The system also includes an access determination engine configured to selectively grant access to the target object based on a first set of access control instructions that have attributes that match the context and a second set of access control instructions having attributes that are hierarchically broader than the attributes of the context.

A method for selectively granting access to a target object is disclosed. The method includes receiving a context comprising an actor attribute, an action attribute, and a target attribute. The method also includes determining a first set of hierarchically broader actor attributes based on the actor attribute. The method also includes determining a second set of hierarchically broader action attributes based on the action attribute. The method also includes determining a third set of hierarchically broader target attributes based on the target attribute. The method also includes determining, based on the actor, action and target attributes and the first, second and third set of hierarchically broader attributes, a set of relevant access control instructions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
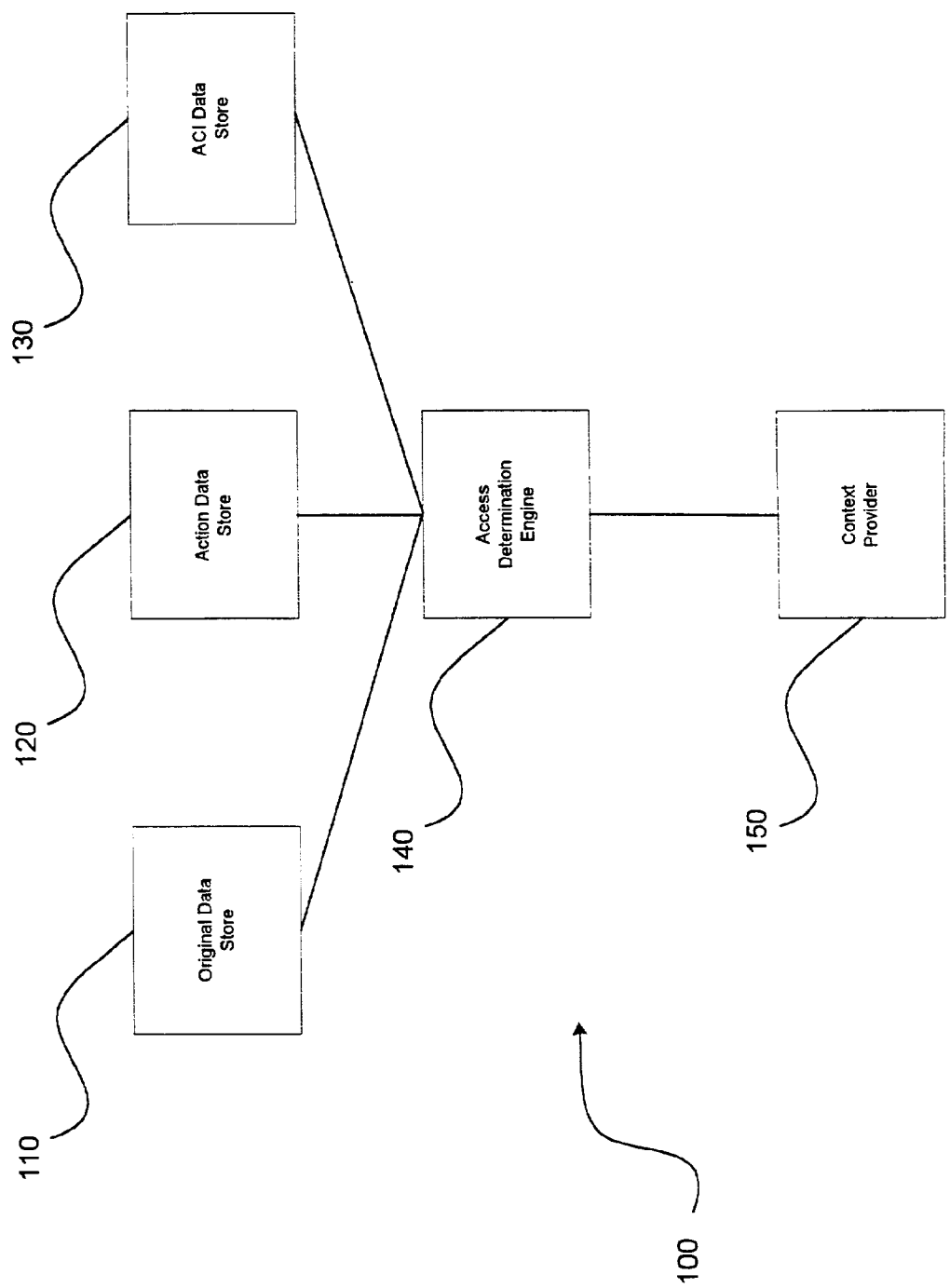
FIG. 1 illustrates a block diagram of an access control system in accordance with an embodiment of the present invention.

Reference will now be made in detail to the preferred embodiment of the present invention, examples of which are illustrated in the drawings.

According to FIG. 1, access control system 100 determines whether a requesting or actor object may perform a particular action on a requested or target object. More specifically, access control system 100 determines whether an actor object may perform an action on a target object based on one or more relevant instructions. The instructions may be known as access control instructions ("ACIs"), wherein relevant ACIs are determined based upon a hierarchical structure of the actor, action, and target data stores. For example, access control system 100 may be used to allow a first actor ("person X") of a group ("company Y") to perform a particular action ("read") on a target ("company Y account") because an ACI establishes that all members of company Y may perform all actions on the company Y account. In addition to the targets and actors having a hierarchical relationship, the actions may have an implication hierarchy in which the granting of permission to perform a first action, such as update, implicitly grants the permission to perform a second action, such as read.

To implement this and other functions, access control system 100 may be configured as depicted in FIG. 1. Access control system 100 may comprise object data store 110, action data store 120, ACI data store 130, access determination engine 140, and context provider 150. Each of these data stores may be managed by operationally independent companies. For example, action data store 120 and ACI data store 130 may be managed by a service-provider company. Additionally, object data store 110 may be managed by two or more operationally independent companies. For example, object data store 110 may comprise a first set of objects that is managed by a first company and a second set of objects that is managed by a second company. Each of the data stores may be implemented as a directed acyclic graph in a Lightweight Directory Access Protocol ("LDAP") server, in a database such as an extensible markup language ("XML") file, or otherwise stored or determined. Data stores 110, 120, 130, and context provider 150 may transmit and receive data from access determination engine 140 by any type of logical or physical communication path, including a system bus, an Internet connection, a virtual private network connection, a local area network connection, a wireless connection, other type of connection, and the like. Each of these components is described in greater detail below.

Object data store 110 comprises a set of information relating to actors and targets. In one embodiment, object data store 110 comprises a set of proxy objects for data that is stored and managed outside of object data store 110. For example, objects may comprise information relating to a buyer, a seller, a pricelist, a location, or other type of entity. Object data store 110 may comprise one or more logical tree structures, as disclosed in greater detail in relation to FIG. 2. A logical tree structure may relate to a target object in a first access determination process and an actor object in a second access determination process. A target may be defined as an entity or group of entities to which a particular ACI applies. An actor, on the other hand, may be defined as a resource that is attempting to perform an action upon a target. For example, the object may be a proxy for a human user of the system.

Action data store 120 comprises information relating to a plurality of possible actions that are managed by the present invention. An action may be defined as a specific operation that an actor object may perform on a target. For example, action data store 120 may include one or more of the following actions: update, read, delete, create, and the like. Additionally, action data store 120 may comprise additional, user-defined actions. For example, a user may create a new type of action entitled "purchase" to create ACIs that establish a group of actors that may perform the purchase action on a group of targets. Action data store 120 may comprise an implication hierarchy in which the granting of permission to perform a first action, such as update, implicitly grants the permission to perform a second action, such as read. This implication hierarchy may be modified based on the attributes of a particular organization. For example, the implication hierarchy may be modified such that an authorization to perform the second action implicitly grants permission to perform the first action. By way of a specific example, a first organization may imply a create access when an update access is provided (e.g., if a user is granted the permission to create objects, the user is implicitly granted permission to update objects), whereas a second organization may not imply a create access when an update access is provided. Additionally, the implication hierarchy may be modified to include actions that are added by a particular organization.

ACI data store 130 comprises a plurality of ACIs. In one embodiment, ACIs have an actor attribute, an action attribute, and a target attribute. ACI data store 130 may receive a set of relevant attributes and, based on these attributes, return one or more ACIs. The characteristics of an ACI are explained in greater detail with respect to FIG. 5 below.

Access determination engine 140 is responsible for selectively determining whether to allow or deny access when a given context is received. Access determination engine 140 may receive a context from context provider 150. Additionally, access determination engine 140 may receive a set of relevant actor, action, and target objects from object and action data stores 110 and 120. Furthermore, access determination engine 140 may receive a set of relevant ACIs from ACI data store 130. The process by which access determination engine 140 receives this information and determines whether to allow access is described in greater detail in relation to FIG. 4 below.

Context provider 150 provides context to access determination engine 140. For example, context provider 150 may be an electronic-commerce application. Context provider 150 also may provide a context comprising an actor attribute, an action attribute, and a target attribute. Additional information may be provided, such as an actor internet protocol address.

Figure 2:
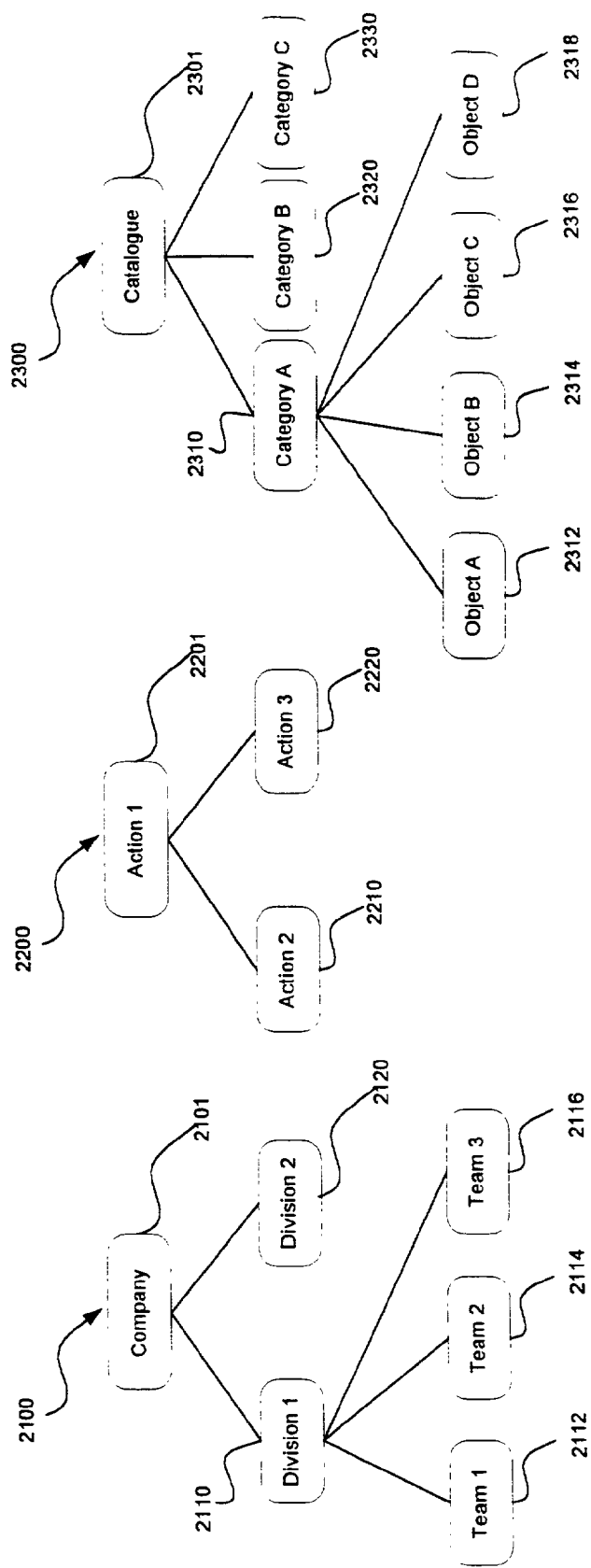
FIG. 2 illustrates an actor tree, an action tree, and a target tree with operational identifiers in accordance with an embodiment of the present invention.

FIG. 2 depicts a diagram of an actor tree 2100, an action tree 2200, and a target tree 2300 with operational identifiers. Trees 2100, 2200, and 2300 may be represented, for example, in an LDAP server, in a relational database, an XML document, or in another type of hierarchical data structure. Additionally, trees 2100, 2200, and 2300 may be generated dynamically when a context is received by access determination engine 140.

By way of example, company organization chart 2100 depicts an organization for Company 2101. Company 2101 includes two divisions, Division (1) 2110 and Division (2) 2120. Division (1) 2110 includes three teams 2112, 2114, and 2116. Additionally, some or all of the teams may have individuals associated with the team (not shown). Similarly, Division (2) 2120 may include additional teams, individuals, or other nodes and/or leafs that are not shown. Company organization chart 2100 is managed entirely by Company 2101, such that a system receives updates to company organization chart 2100 from Company 2101. Alternatively, company organization chart 2100 comprises a proxy representation of an externally managed data store.

In one embodiment, an access request by an actor may invoke one or more relevant ACIs. Thus, all matching and hierarchically broader ACIs may be relevant to a received context. For example, a context indicating that a transaction between Team (1) 2112 has requested to perform Action (2) 2220 on Target Object (C) 2316 may invoke a hierarchically broader ACI having attributes associated with Division (1) 2110, Action (2) 2220, and Category (A) 2310. The broadest buyer-seller-object rule for the hierarchies depicting in FIG. 2 is between Company 2101, Action (1) 2201, and Catalogue 2301.

Figure 3:
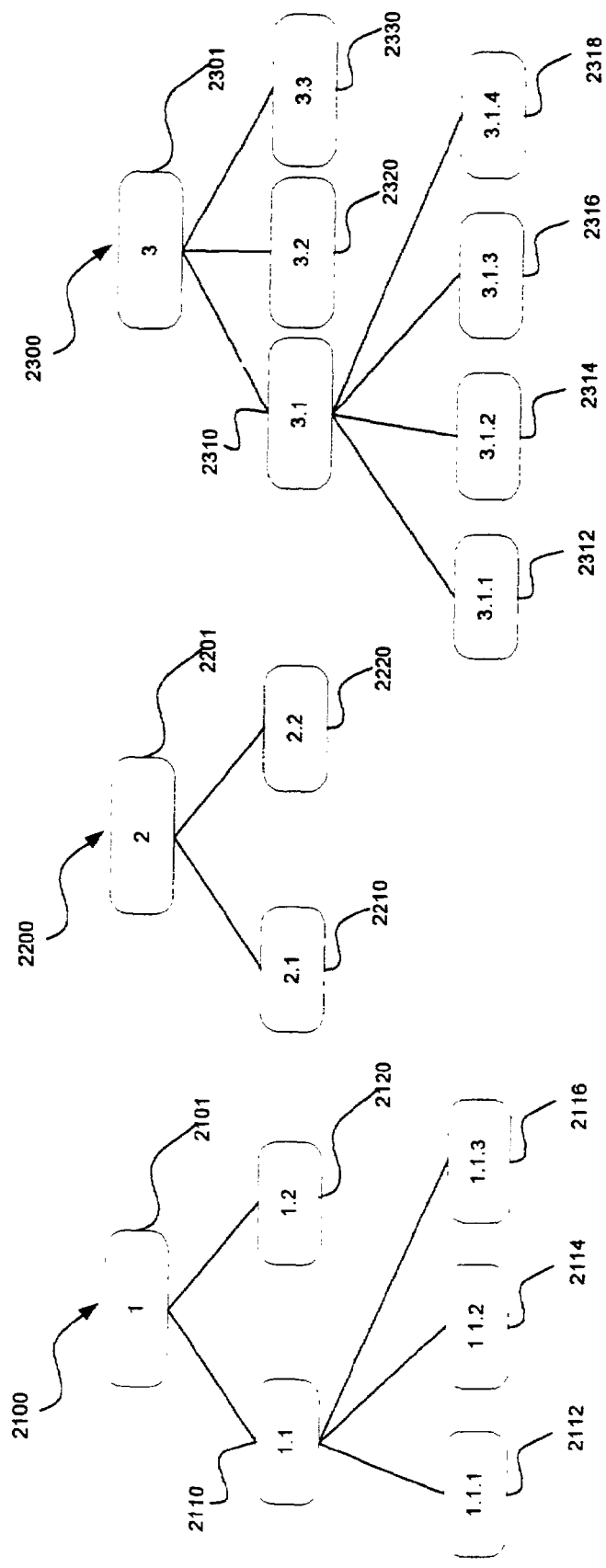
FIG. 3 illustrates an actor tree, an action tree, and a target tree with unique identifiers in accordance with an embodiment of the present invention.

FIG. 3 depicts a block diagram of an actor tree, an action tree, and a target tree with unique identifiers. Each organization may have a global unique identifier within the system. These unique identifiers may be managed by the manager of access determination engine 140, by a third party, such as a data universal numbering system ("DUNS"), by a combination thereof or by any method that uniquely identifies an organization. Additionally, each operational unit of an organization may be assigned a local unique identifier that is used in conjunction with the unique identifier of the organization. Similarly, product objects may have unique identifiers that identify the product object independent of the company that makes the product and/or provides the service. Examples of such unique identifiers are universal product codes ("UPC") and international standard book numbers ("ISBN"). Additionally, the system may create its own unique identification system, as depicted in FIG. 3.

Figure 4:
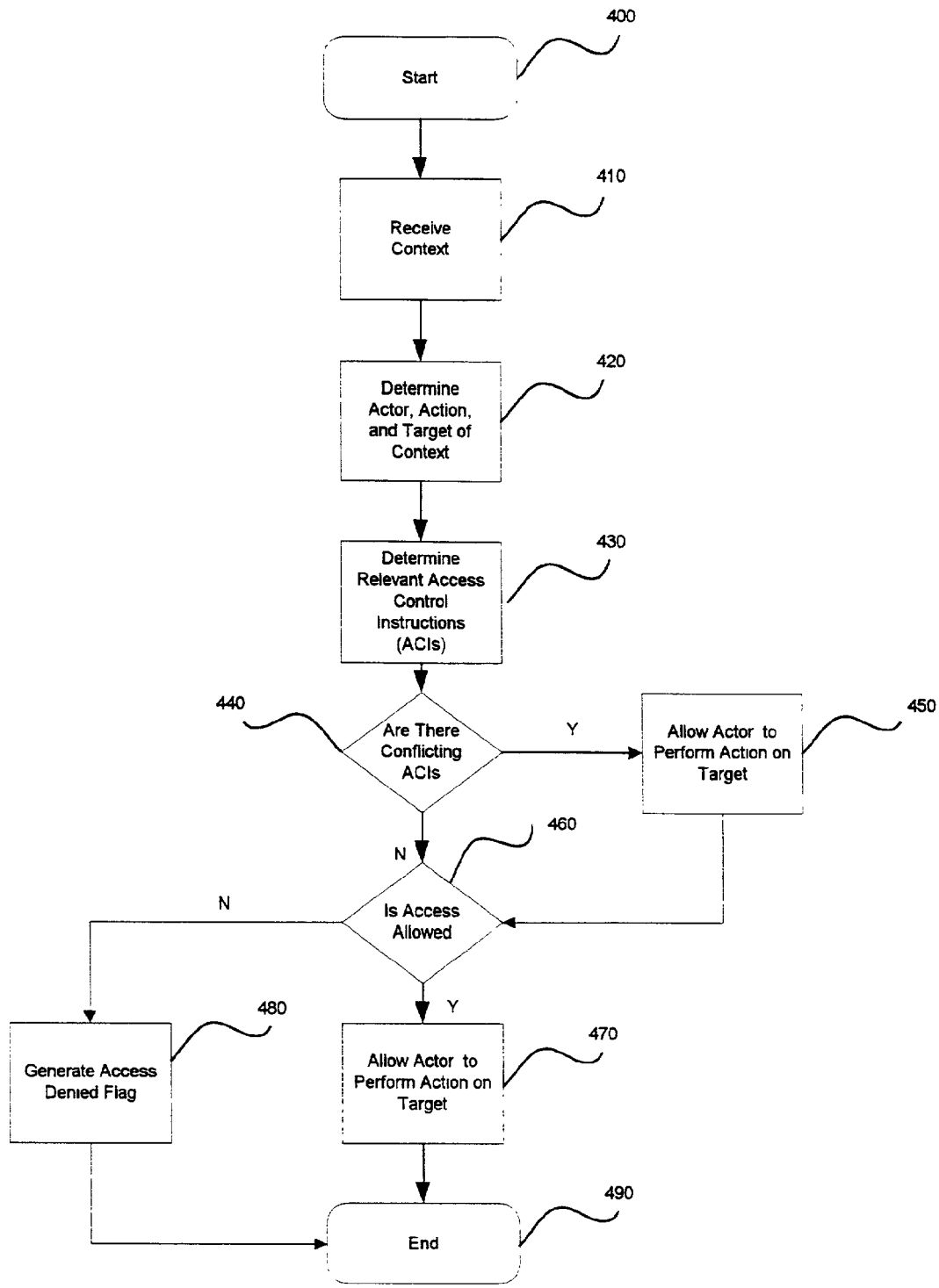
FIG. 4 illustrates a flowchart for an access determination process in accordance with an embodiment of the present invention.

FIG. 4 depicts a flowchart for an access determination process in accordance with the present invention. The process is initiated at step 400. At step 410, the system receives a context. At step 420, the system determines actor, action, and target attributes of the received context. At step 430, the system determines relevant ACIs. At step 440, the system determines whether there are conflicting ACIs, such as multiple relevant ACIs. If there are conflicting ACIs, the system proceeds to step 450 and performs conflict resolution. The system then proceeds to step 460. If there are no conflicting rules at step 440, the system proceeds directly to step 460. At step 460, the system determines whether access is allowed. If access is allowed, the system proceeds to step 470 and allows the actor to perform the requested action on the target. If access is not allowed, system proceeds to step 480 and generates a flag that access was denied. The process terminates at step 490. Each of these steps is described in greater detail below.

At step 410, the system receives a context. This context may be received by access determination engine 140. For example, access determination engine 140 may receive a context having the an actor attribute value of 1.1.1, an action attribute value of 2.1, and a target attribute value of 3.1.3. This context may be received as a recordset, an XML document, or by other data communication methodology.

At step 420, the system determines actor, action, and target attributes of the received context. For example, using the context described above, the system may determine that the received context has an actor attribute value of 1.1.1, an action attribute value of 2.1, and a target value of 3.1.3. From this received context, the system may determine that the actor object is a child of actor object 1.1, and that actor object 1.1 is similarly a child of actor object 1. These logical tree relationships may be returned to the access determination engine 140 so that it may determine which rules are relevant, as discussed in greater detail with reference to step 430.

At step 430, the system determines relevant ACIs pricing rules. In one embodiment, all matching and hierarchically broader ACIs are relevant rules. A hierarchically broader rule is any rule that applies to the current context due to inheritance based on the data store hierarchy. In the present example, each of the following rules would be relevant as hierarchically broader ACIs:

1.1.1, 2.1, 3.1.3=Received Context
 1.1, 2.1, 3.1.3=Broader (Parent of 1.1.1)
 1, 2.1, 3.1.3=Broader (Grandparent of 1.1.1)
 1.1.1, 2, 3.1.3=Broader (Parent of 2.1)
 1.1.1, 2.1, 3.1=Broader (Parent of 3.1.3)
 1, 2, 3=Broadest Rule (Grandparent of 1.1.1 and 3.1.3, Parent of 2.1)

There are additional, unlisted hierarchically broader rules. In addition to filtering rules based on actor, action, and target attribute values and hierarchies, other parameters may be used. For example, an otherwise applicable ACI may be inapplicable if an effective date criteria is not satisfied.

At step 440, the system determines whether there are conflicting ACIs, such as multiple relevant ACIs. Specifically, the system may determine whether any relevant ACIs have conflicting access values, such as allow/grant or deny, with each other and/or whether any relevant ACIs have conflicting access values with a default access rule. The default access rule may deny access and any relevant ACI automatically supersedes this default access denial. Explicit access denials, however, are not superseded, and are resolved in accordance with the conflict resolution policy, as disclosed with respect to step 450.

If there are conflicting ACIs at step 440, the system proceeds to step 450 and performs conflict resolution. The conflict resolution strategy may be implemented such that if any relevant rule denies access, access is denied. This conflict resolution strategy denies access even if, for example, an ACI that matches the received context grants access whereas a hierarchically broader ACI denies access. Other conflict resolution policies also may be implemented.

The system then proceeds to step 460 and determines whether access is allowed. If there are no conflicting rules at step 440, the system proceeds directly to step 460. If access is allowed, the system proceeds to step 470 and allows the actor to perform the requested action on the target. For example, the system may allow a user to update a sales record object. If access is not allowed, the system may generate a flag that access was denied. For example, if several relevant ACIs granted access and one denied access, access is denied and the system throws an exception and logs that the access attempt occurred and was denied. Other actions also may be taken upon the denial of access to a requested target.

Figure 5:
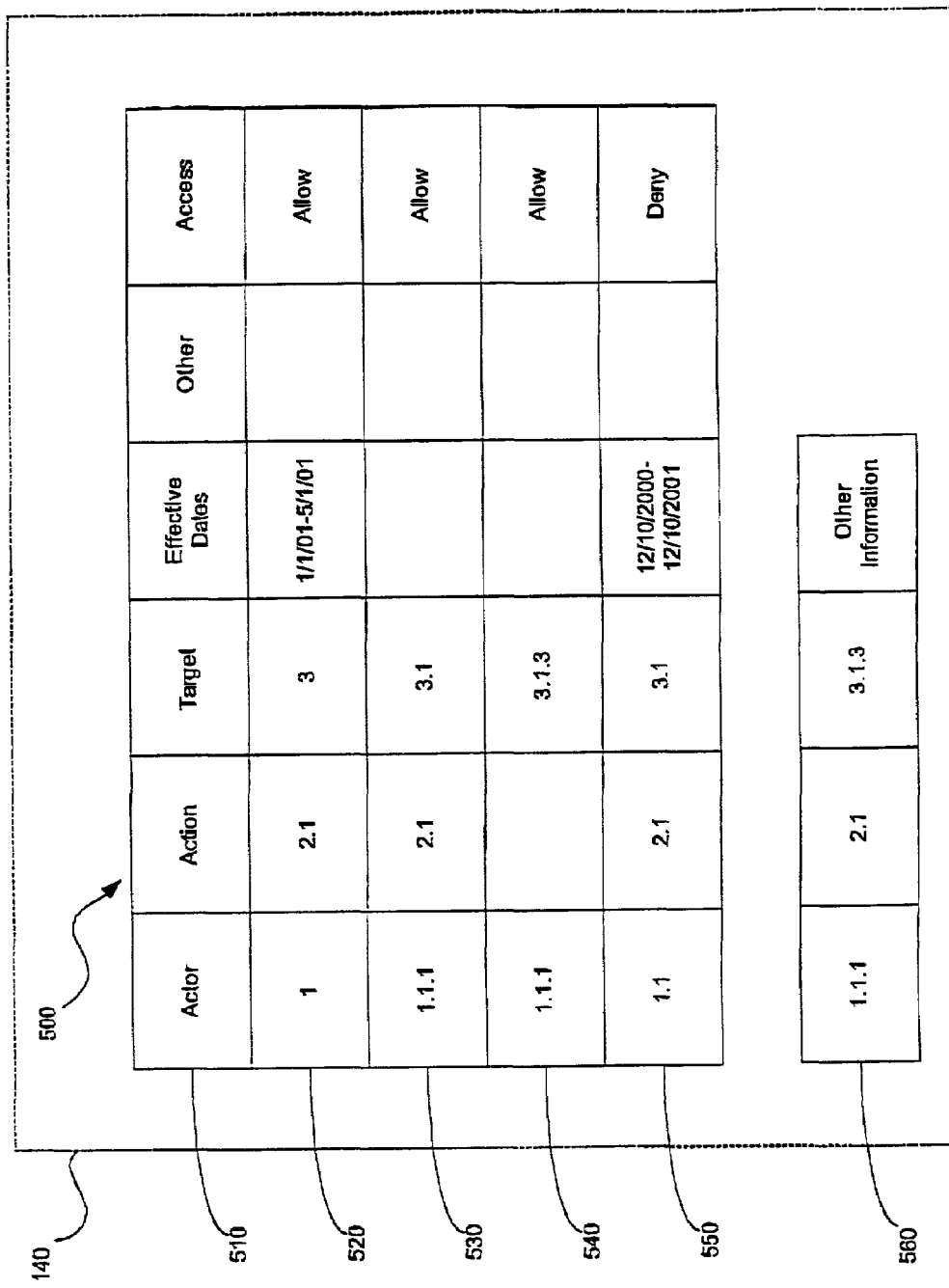
FIG. 5 illustrates a logical diagram of a memory structure associated with an access control engine in accordance with an embodiment of the present invention.

FIG. 5 depicts a logical diagram of a memory structure of relevant ACIs in accordance with the present invention. Context 560 is provided to access determination engine 140 as disclosed above. Access determination engine 140 determines which actor attributes are broader hierarchically than the context's actor attribute in conjunction with object data store 110. Specifically, the system determines that target objects 1.1 and 1 are both broader hierarchically than the actor attribute of context 560. Similarly, the system determines that action 2 and target 3.1 and 3 are broader hierarchically than their respective context attributes. This information is then used by access determination engine 140 in conjunction with ACI data store 130 to determine which ACIs are relevant to context 560.

Any ACI having attributes that match the received context (e.g., 1.1.1, 2.1, and 3.1.3) or having attributes that are broader hierarchically than the received context (1.1 or 1, 2, and 3.1 or 3) may be relevant ACIs. If an ACI has any attribute that fails to match and fails to be broader hierarchically than the received context, such as an ACI having an action 2.2 attribute value, the ACI is not relevant. The absence of an attribute in an ACI may indicate that the ACI is unrestricted with respect to that attribute.

Accordingly, as depicted in FIG. 5, relevant ACIs 510, 520, 530, 540, 550, and the received context 560 may be stored in a memory structure 500 associated with access determination engine 140. As disclosed above, those ACIs that match the received context 560 (e.g., relevant ACI 540 matches the received context 560) and those ACIs that are hierarchically broader than the received ACI (e.g., relevant ACIs 510, 520, 530, and 550 may be broader hierarchically than the received context 560) may be provided to memory structure 500. The present invention may be implemented using query-filters for ACIs and other objects. For example, the list of relevant ACIs based on a received context may be implemented by constructing the appropriate query filter to return relevant ACIs, rather than retrieving all the ACIs and filtering the result set.

To further illustrate the relevant ACI determination process, each of the relevant ACIs depicted in FIG. 5 may be evaluated. Relevant ACI 510 is relevant because each of the ACI's attribute values are the root values of the hierarchy and, therefore, each is broader hierarchically than the corresponding context attribute value. Accordingly, this ACI establishes that during the effective period, any object in Company may perform action 2.1 on any object in Catalogue, subject to any conflicting ACIs. Relevant ACI 520 is relevant because the actor and action attributes of the ACI match those of the received context, and the target attribute (3.1) is broader hierarchically than that of the received context (3.1.3). Relevant ACI 540 is relevant because the actor and target attributes of the ACI match those of the received context, and the action attribute is left blank, meaning that the value defaults to the root value which is hierarchically broader than 2.1. Finally, relevant ACI 550 is relevant because the action attribute matches that of the received context, and the actor and target attributes are broader hierarchically than the received context.

The application programming interface ("API") may be patterned after the security architecture in a java platform with two distinctions—the ability to have multiple security policies concurrently active in an execution context, and a data-object aware API that is based on object handles. Each data object can be identified by a handle. The handle plays the role of java.security.Principal and identifies the caller (i.e., actor in the present invention) whose privileges are to be checked. The exposed programming interface is configured to be as similar as possible with the java security architecture, thereby shielding system administrators from the implementation of the data store subsystems 110, 120, and, 130. For example, data store subsystems 110, 120, and, 130 could be implemented as an LDAP server, a relationship-based attribute server, or a hybrid of the two without changing the API exposed to an administrator. In this way, the present invention may be implemented in a data store agnostic manner.

It is understood that there are two modes of access control enforcement mandatory and advisory. With mandatory access control, all paths to an object are guarded by an ACI. This kind of access control may be enforced by the data store that contains the object. The data store performs the appropriate check before permitting access to the target. Advisory access control is less robust than the mandatory access control. With advisory control, an application guards its advertised paths to the data store. The present invention may be implemented in accordance with either of these access control enforcement schemes. The type of access control enforcement scheme may be determined based on an object definition, thereby enabling the access control enforcement scheme to be changed without modifying any source code.

The present invention may be implemented using groups. A group represents a collection of objects, such as business objects. Each group has a name, a unique identifier, and a collection of objects. While it may be desirable to have an ACI for each pair of objects that make up an actor and a target, several problems, may result such as including the large administrative overhead, large number of ACIs, and the fact that the security administration does not naturally model the business policies. The net result is that such a model does not scale well with the number of targets and actors. Ease of administration is facilitated by using the notion of object groups. Groups are the basic unit of granularity in access control administration.

Access control groups may become self-defeating if there are too many groups relative to the number of objects in the system, or if the groups are not designed with sufficient care. Groups are defined to implement a specified security policy, rather than having to infer the policy based on the ACI and the group distribution. It is possible to specify a group in accordance with the present invention in a number of ways, including: by specifying the object class/type; by enumerating set of objects (e.g., GUID, or by the pair of object-type, primary-key); by specifying a collection of groups that are aggregated to form this group; and by specifying the relationship with respect to an object; by specifying a 'bind rule'—i.e., an applicability condition (the name of a search filter that is known to the system—a SQL query file or an LDAP search filter). Other techniques of specifying groups also may be used. A system administrator may limit the nesting of groups in order to decrease processor load and increase system speed. Groups may establish hierarchy, or may be defined in addition to the existing hierarchy for better definition access control in a particular system.

The present invention may be implemented using object-oriented design patterns and an object oriented programming language. Accordingly, the sequence of acts implemented by the present invention may be modified without departing from the scope of the present invention. By way of specific example, the system may determine which analysis framework is applicable at any time after the transaction has been received.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A system for selectively granting access to a target object, comprising:
   an object data store that includes a plurality of hierarchically structured target objects and a plurality of hierarchically structured actor objects;
   an action data store that includes a plurality of action objects;
   an access control instruction data store comprising a plurality of hierarchically structured access control instructions;
   a context comprising an actor attribute, an action attribute, and a target attribute; and
   an access determination engine configured to selectively grant access to the target object based on a first set of access control instructions having attributes that match the context and a second set of access control instructions having attributes that are hierarchically broader than the attributes of the context, wherein the access determination engine determines whether the first set of access control instructions and the second set of access control instructions are relevant, and responsive to determining that the first set of access control instructions and the second set of access control instructions are relevant then determining whether any of the first set of access control instructions conflict with any of the second set of access control instructions and, when conflicting instructions are found, resolving access control instruction conflicts by determining whether access control instruction access attribute values for the first and second set of access control instructions conflict with either each other or a default access value and responsive to determining that any access control instruction value denies access to the target object including the default access value, denying access to the target object.

2. The system of claim 1, wherein the object data store and the access control instruction data store comprise one of a lightweight directory access protocol compliant server and a relational database.

3. The system of claim 1, wherein the action objects in the action data store are hierarchically related and define an implication hierarchy.

4. The system of claim 3, wherein an action object data store is configured to enable the addition of an action.

5. The system of claim 4, wherein the action object added to the action data store is added to the implication hierarchy.

6. The system of claim 1, wherein each of the plurality of hierarchically structured access control instructions comprises an actor attribute, an action attribute, a target attribute, and an access attribute.

7. The system of claim 1, wherein the context is provided to the system by an electronic commerce application.

8. The system of claim 1, wherein the determining of access control instruction relevancy is determined according to the actor action, and target attributes.

9. A method for selectively granting access to a target object, comprising:
   receiving a context comprising an actor attribute, an action attribute, and a target attribute;
   determining a first set of hierarchically broader actor attributes based on the actor attribute;
   determining a second set of hierarchically broader action attributes based on the action attribute;
   determining a third set of hierarchically broader target attributes based on the target attribute;
   determining a set of relevant access control instructions according to the actor, action, and target attributes and the first, second, and third sets of hierarchically broader relevant attributes and;
   determining whether any of the set of relevant access control instructions are conflicting access control instructions and, when conflicting instructions are found, resolving access control instruction conflicts by determining whether access control instruction access attribute values for the first, second, and third set of access control instructions conflict with either each other or a default access value and responsive to determining that any access control instruction value denies access to the target object including the default access value, denying access to the target object.

10. The method of claim 9, wherein the step of determining a first set of hierarchically broader actor attributes comprises accessing a hierarchically structured actor data store.

11. The method of claim 9, wherein the step of determining a third set of hierarchically broader target attributes comprises accessing a hierarchically structured target data store.

12. The method of claim 9, wherein the step of determining a second set of hierarchically broader action attributes comprises accessing a hierarchically structured action data store.

13. The method of claim 12, further comprising:
   adding an action object to the action data store.

14. The method of claim 13, further comprising:
   adding the added action object to a hierarchy associated with the action data store.

15. The method of claim 9, wherein the context is received from an electronic commerce application.

16. A computer program product, comprising a computer readable medium having computer code embodied therein for selectively granting access to a target object comprising:

a computer readable program code device configured as an object data store comprised of a plurality of hierarchically structured target objects and a plurality of hierarchically structured actor objects;
   a computer readable program code device configured as an access control instruction data store comprising a plurality of hierarchically structured access control instructions;
   a computer readable program code device configured as an action data store comprising a plurality action objects
   a computer readable program code device configured as a context comprising an actor attribute, an action attribute, and a target attribute; and
   an access determination engine configured to selectively grant access to the target object based on a first set of access control instructions having attributes that match the context and a second set of access control instructions having attributes that are hierarchically broader than the attributes of the context, wherein the access determination engine determines whether any of the first set of access control instructions conflict with any of the second set of access control instructions and, when conflicting instructions are found, resolving access control instruction conflicts by determining whether access control instruction access attribute values for the first and second set of access control instructions conflict with either each other or a default access value and responsive to determining that any access control instruction value denies access to the target object including the default access value, denying access to the target object.

17. A system for selectively granting access to a target object, comprising;
   means for receiving a context comprising an actor attribute, an action attribute, and a target attribute;
   means for determining a first set of hierarchically broader actor attributes based on the actor attribute;
   means for determining a second set of hierarchically broader action attributes based on the action attribute;
   means for determining a third set of hierarchically broader target attributes based on the target attribute;
   means for determining a set of relevant access control instructions according to the actor, action, and target attributes and the first, second, and third sets of hierarchically broader relevant attributes; and
   means for determining whether any of the set of relevant access control instructions are conflicting access control instructions and, when conflicting instructions are found, resolving access control instruction conflicts by determining whether access control instruction access attribute values for the first and second set of access control instructions conflict with either each other or a default access value and responsive to determining that any access control instruction value denies access to the target object including the default access value, denying access to the target object.

18. A computer program product comprising a computer useable medium having computer readable code embodied therein selectively granting access to a target object, the computer program product adapted when run on a computer to execute steps, including:
   receiving a context comprising an actor attribute, an action attribute, and a target attribute;
   determining a first set of hierarchically broader actor attributes based on the actor attribute;

determining a second set of hierarchically broader action attributes based on the action attribute;

determining a third set of hierarchically broader target attributes based on the target attribute;

determining a set of relevant access control instructions according to the actor action, and target attributes and the first, second and third sets of hierarchically broader relevant attributes; and determining whether any of the set of relevant access control instructions are conflicting access control instructions and, when conflicting instructions are found, resolving access control instruction conflicts by determining whether access control instruction access attribute values for the first, second, and third set of access control instructions conflict with either each other or a default access value and responsive to determining that any access control instruction value denies access to the target obiect including the default access value, denying access to the target obiect.

* * * * *